(12) United States Patent
Delaney et al.

(10) Patent No.: US 7,774,545 B2
(45) Date of Patent: Aug. 10, 2010

(54) SYSTEM AND METHOD OF VOLUME GROUP CREATION BASED ON AN AUTOMATIC DRIVE SELECTION SCHEME

(75) Inventors: William Delaney, Wichita, KS (US); Praful Dambal, Bangalore (IN)

(73) Assignee: LSI Corporation, Milpitas, CA (US)

( * ) Notice: Subject to any disclaimer, the term of this patent is extended or adjusted under 35 U.S.C. 154(b) by 394 days.

(21) Appl. No.: 11/654,056

(22) Filed: Jan. 16, 2007

(65) Prior Publication Data
US 2008/0133831 A1 Jun. 5, 2008

(30) Foreign Application Priority Data
Dec. 1, 2006 (IN) .................. 2230/CHE/2006

(51) Int. Cl.
*G06F 13/00* (2006.01)

(52) U.S. Cl. ........................... 711/114

(58) Field of Classification Search ............ 711/114
See application file for complete search history.

(56) References Cited

U.S. PATENT DOCUMENTS

| | | | |
|---|---|---|---|
| 6,405,284 B1* | 6/2002 | Bridge | 711/114 |
| 6,754,082 B1* | 6/2004 | Ding et al. | 361/727 |
| 2003/0188085 A1* | 10/2003 | Arakawa et al. | 711/100 |
| 2004/0064638 A1* | 4/2004 | Chong, Jr. | 711/114 |
| 2005/0114593 A1* | 5/2005 | Cassell et al. | 711/114 |
| 2005/0283655 A1* | 12/2005 | Ashmore | 714/7 |
| 2006/0179170 A1* | 8/2006 | Kodama | 710/8 |

* cited by examiner

*Primary Examiner*—Hetul Patel
(74) *Attorney, Agent, or Firm*—Raj Abhyanker, P.C.

(57) ABSTRACT

A method and a system for volume group creation based on an automatic drive selection scheme are disclosed. In one embodiment, a method of a redundant array of independent drives (RAID) includes processing at least one attribute data describing a volume group of the RAID. The method also includes automatically selecting a plurality of drives of the volume group based on at least one of an optimum tray distribution of the volume group, a spindle speed of each drive in the volume group, and an alignment of the plurality of drives in the volume group. In another embodiment, a system of a RAID includes a user device to communicate an attribute data describing a volume group of the RAID, and a drive selection module to automatically select a plurality of drives of the volume group based on the attribute data using a baseline selection algorithm.

15 Claims, 8 Drawing Sheets

| DRIVE TRAY | SLOT | SPINDLE SPEED |
|---|---|---|
| 1 | 1 | 10K |
| 1 | 2 | 10K |
| 1 | 3 | 15K |
| 1 | 4 | 15K |
| 2 | 1 | 10K |
| 2 | 2 | 10K |
| 2 | 3 | 15K |
| 2 | 4 | 15K |
| 3 | 1 | 10K |
| 3 | 2 | 15K |
| 3 | 3 | 15K |
| 4 | 1 | 15K |
| 4 | 2 | 15K |

FIGURE 4A

| GROUP VALUE | DRIVE TRAY VALUE | DRIVE VALUE (TRAY ID, SLOT ID) | SPINDLE SPEED |
|---|---|---|---|
| G1 | T1 | 1,3 | 15K |
| | | 1,4 | 15K |
| | | 1,1 | 10K |
| | | 1,2 | 10K |
| | T2 | 2,3 | 15K |
| | | 2,4 | 15K |
| | | 2,1 | 10K |
| | | 2,2 | 10K |
| G2 | T3 | 3,2 | 15K |
| | | 3,3 | 15K |
| | | 3,1 | 10K |
| G3 | T4 | 4,1 | 15K |
| | | 4,2 | 15K |

FIGURE 4B

| DRIVE VALUE (TRAY ID, SLOT ID) | SPINDLE SPEED |
|---|---|
| 1,3 | 15K |
| 2,3 | 15K |
| 3,2 | 15K |
| 4,1 | 15K |
| 1,4 | 15K |

FIGURE 4C

SYSTEM AND METHOD OF VOLUME GROUP CREATION BASED ON AN AUTOMATIC DRIVE SELECTION SCHEME

FIELD OF TECHNOLOGY

This disclosure relates generally to the technical fields of system and method of volume group creation based on an automatic drive selection scheme.

BACKGROUND

A volume group may be the highest level abstraction used within a logical volume manager. The volume group may gather a collection of logical volumes and/or physical volumes into an administrative unit, and/or the volume group may be a collection of the physical (e.g., local and/or remote) volumes from which a logical volume (e.g., essentially a partition) may be created. The logical volume may be an abstraction of a drive (e.g., a physical hard disk). The abstraction may either consist of a portion of the drive, known as a partition, and/or the abstraction may consist of a set of drives, such as a RAID.

In order to form the volume group, the set of drives may be selected based on a description of the volume group. If the set of drives are located in few trays (e.g., where each tray may hold a number of the drives), a failure of any of the few trays may result in a loss (e.g., entire and/or partial) of data which may not be recoverable. In addition, the set of drives may have a diverse range of spindle speed which may not be an optimal condition in operating the volume group. Moreover, channels between controllers and the set of drives (e.g., RAID controller I/O channels) may not be optimally utilized when less utilized channels coupled to the volume group are not selected deliberately.

SUMMARY OF THE DISCLOSURE

A method and/or a system of volume group creation based on an automatic drive selection scheme is/are disclosed herein. In one aspect, a method of a redundant array of independent drives (RAID) includes processing attribute data (e.g., which may include at least a size request data determining a total number of the drives in the volume group) describing a volume group of the RAID.

The method also includes automatically selecting drives of the volume group based on an optimum tray distribution (e.g., which may be obtained through selecting the drives such that the drives are substantially evenly distributed across a maximum number drive trays with each drive tray holding selectable drive) of the volume group, a spindle speed (e.g., where the spindle speed of the each drive in the volume group may be no slower than a spindle speed of any one of unselected drives in the each of the drive trays) of each drive in the volume group, and an alignment of the drives in the volume group (e.g., through selecting the drives based on slot locations of the drives).

In addition, the method may include accessing each of the drives through a preferred controller I/O channel that is less utilized when a dispersion request data of the attribute data is processed. Furthermore, the method may include constructing mirrored pairs with the drives based on a RAID conformance algorithm when the volume group is based on a RAID level 1 and a RAID level 10.

In another aspect, a system of a redundant array of independent drives (RAID) includes a user device to communicate an attribute data describing a volume group of the RAID, and a drive selection module to automatically select drives of the volume group based on the attribute data using a baseline selection algorithm. The system may also include a tray distribution module of the baseline selection algorithm to iteratively select a single drive from each of drive trays of the volume group starting from a larger drive tray until a requested number of drives in the volume group is reached.

The system may further include a spindle speed module of the baseline selection algorithm to select the drives with each of the drives having the spindle speed no slower than a spindle speed of any unselected drive in the each of drive trays. In addition, the system may include an alignment module of the baseline selection algorithm to select the drives to achieve a vertical alignment of the drives.

Furthermore, the system may include a channel dispersion module of an extended selection algorithm to select preferred I/O channels of the volume group that are maximally dispersed among I/O channels of the RAID. Moreover, the system may include a RAID conformance algorithm to automatically select the drives that are dispersed across an overall set of drive-side I/O channels such that better read and write operations are achieved on the volume group. Also, the system may include a best drive module to select the drives of the volume group based on a combination of the baseline selection algorithm, the extended selection algorithm, and the RAID conformance algorithm.

In yet another aspect, a method of a controller firmware of a redundant array of independent drives (RAID) includes processing attributes (e.g., a number of drives forming the volume group and/or a dispersion request data which triggers a selection of a particular drive with a less utilized preferred I/O channel) describing a volume group of the RAID, constructing a list of tray groups with each member of the tray groups having drive tray with drive selectable to the volume group, descendingly ordering the list of tray groups based on a number of the drive, and automatically selecting a set of drives of the volume group to evenly distribute the set of drives across a maximum number of drive trays.

The method may also include selecting a drive with a higher spindle speed in a particular tray than a drive with a lower spindle speed in the particular tray. The method may further include selecting the set of drives to align the set of drives vertically. The methods, systems, and devices disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4A is a table view of an ordered list of drive trays holding selected drives of a volume group 1 of FIG. 1, according to one embodiment.

FIG. 4B is a table view of an ordered list of groups of drive trays of a volume group 1 of FIG. 1, according to one embodiment.

FIG. 4C is a table view of a list of drives selected into the volume group 1 of FIG. 1, according to one embodiment.

Figure 1:
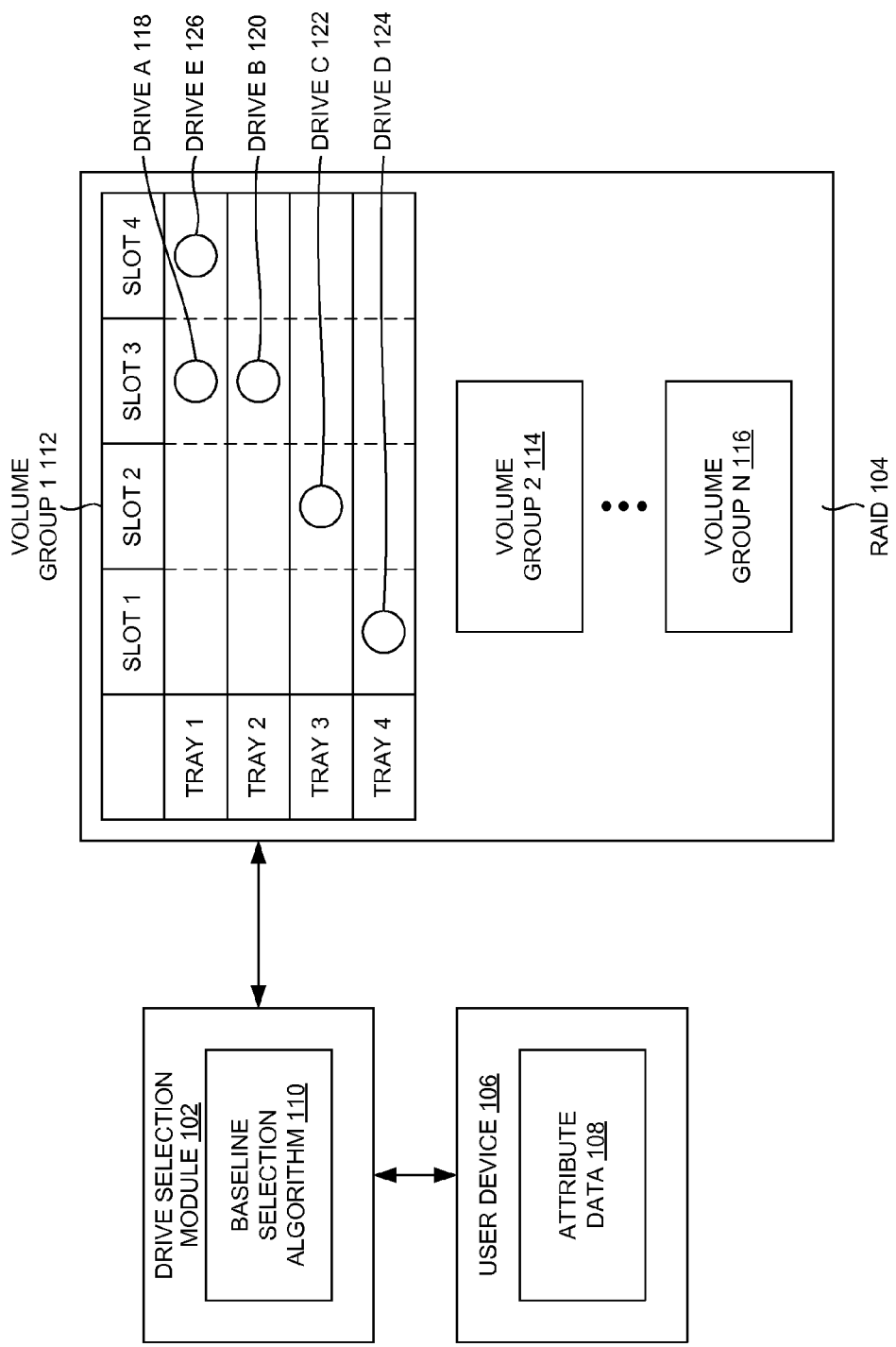
FIG. 1 is a block diagram of a drive selection module interacting with RAID (redundant array of independent drives) drives, according to one embodiment.

Other features of the present embodiments will be apparent from the accompanying drawings and from the detailed description that follows.

DETAILED DESCRIPTION

A method and/or a system of a volume group creation based on an automatic drive selection scheme is/are disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method of a redundant array of independent drives (RAID) includes processing at least one attribute data (e.g., an attribute data 108 of FIG. 1) describing a volume group (e.g., a volume group 1 112) of the RAID (e.g., a RAID 104). The method also includes automatically selecting a plurality of drives of the volume group based on at least one of an optimum tray distribution of the volume group, a spindle speed of each drive in the volume group, and an alignment of the plurality of drives in the volume group.

In another embodiment, a system of a redundant array of independent drives (RAID) includes a user device (e.g., a user device 106 of FIG. 1) to communicate an attribute data describing a volume group of the RAID, and a drive selection module (e.g., a drive selection module 102) to automatically select a plurality of drives of the volume group based on the attribute data using a baseline selection algorithm (e.g., a baseline selection algorithm 110).

In yet another embodiment, a method of a controller firmware of a redundant array of independent drives (RAID) includes processing a plurality of attributes describing a volume group of the RAID, constructing a list of tray groups with each member of the tray groups having at least one drive tray with at least one drive selectable to the volume group, descendingly ordering the list of tray groups based on a number of the at least one drive, and automatically selecting a set of drives of the volume group to evenly distribute the set of drives across a maximum number of drive trays.

Also, the method may be in a form of a machine-readable medium embodying a set of instructions that, when executed by a machine, cause the machine to perform any method disclosed herein. It will be appreciated that the various embodiments discussed herein may/may not be the same embodiment, and may be grouped into various other embodiments not explicitly disclosed herein. It will be appreciated that the various embodiments discussed herein may/may not be the same embodiment, and may be grouped into various other embodiments not explicitly disclosed herein.

FIG. 1 is a block diagram of a drive selection module interacting with RAID (redundant array of independent drives), according to one embodiment. Particularly, the FIG. 1 illustrates a drive selection module 102, RAID 104, a user device 106, an attribute data 108, a baseline selection algorithm 110, a volume group 1 112, a volume group 2 114, a volume group N 116, a drive A 118, a drive B 120, a drive C 122, a drive D 124, and a drive E 126. The drive selection module 102 [e.g., which may be a software entity that groups a set of (e.g., typically cohesive) separately compiled subprograms and data structures, which makes it reusable and allows multiple programmers to work on different modules simultaneously] may select drives to create a volume group based on an attribute data of the volume group.

The RAID 104 may be a disk subsystem (e.g., which may two or more ordinary hard disks and a RAID disk controller) that is used to increase performance and/or provide fault tolerance and/or both. The user device 106 may be a data processing system (e.g., a computer, a work station, etc.) which may be used by a user to access the drive selection module 102 to create a volume of the RAID 104. The attribute data 108 (e.g., which may include a data which may describe a set of drive selected into a volume group of the RAID 104.

The baseline selection algorithm 110 (e.g., which may be a set of ordered steps for solving a problem, such as a mathematical formula and/or instructions in a program) may be an engine driving a drive selection process by the drive selection module 102 to construct a volume group. Each of the volume group 1 112, the volume group 2 114, and the volume group N 116 may be a collection of physical (e.g., local and/or remote) volumes from which a logical volume (essentially a partition) may be created. The Drive A 118, the drive B 120, the drive C 122, the drive D 124, and the drive E 126 (e.g., which may be drives selected into the volume group 1 112) may be classified based on a tray number and a slot number. For example, drive A 118 may be classified as a drive in slot 3 of tray 1.

In example embodiments illustrated in FIG. 1, the user device 106 communicates (e.g., transmit) the attribute data 108 to the drive selection module 102 when a user intends to create a volume group (e.g., the volume group 1 112) of the RAID 104. The drive selection module 102 may select a set of drives of the volume group based on a baseline selection algorithm 110 through interacting with the user device 106 and the RAID 104.

For example, at least one attribute data (e.g., the attribute data 108) describing a volume group of the RAID may be processed. The at least one attribute data may include at least a size request data determining a total number of the plurality of drives in a volume group (e.g., the volume group 1 112). A user device (e.g., the user device 106) may communicate an attribute data describing a volume group (e.g., the volume group 1 112) of a RAID (e.g., the RAID 104). A drive selection module (e.g., the drive selection module 102) may automatically select a plurality of drives of the volume group based on the attribute data using a baseline selection algorithm (e.g., the baseline selection algorithm 110). One of the plurality of attributes may be a number of drives forming the volume group. The plurality of attributes may include a dispersion request data which triggers a selection of a particular drive with a less utilized preferred I/O channel.

Figure 2:
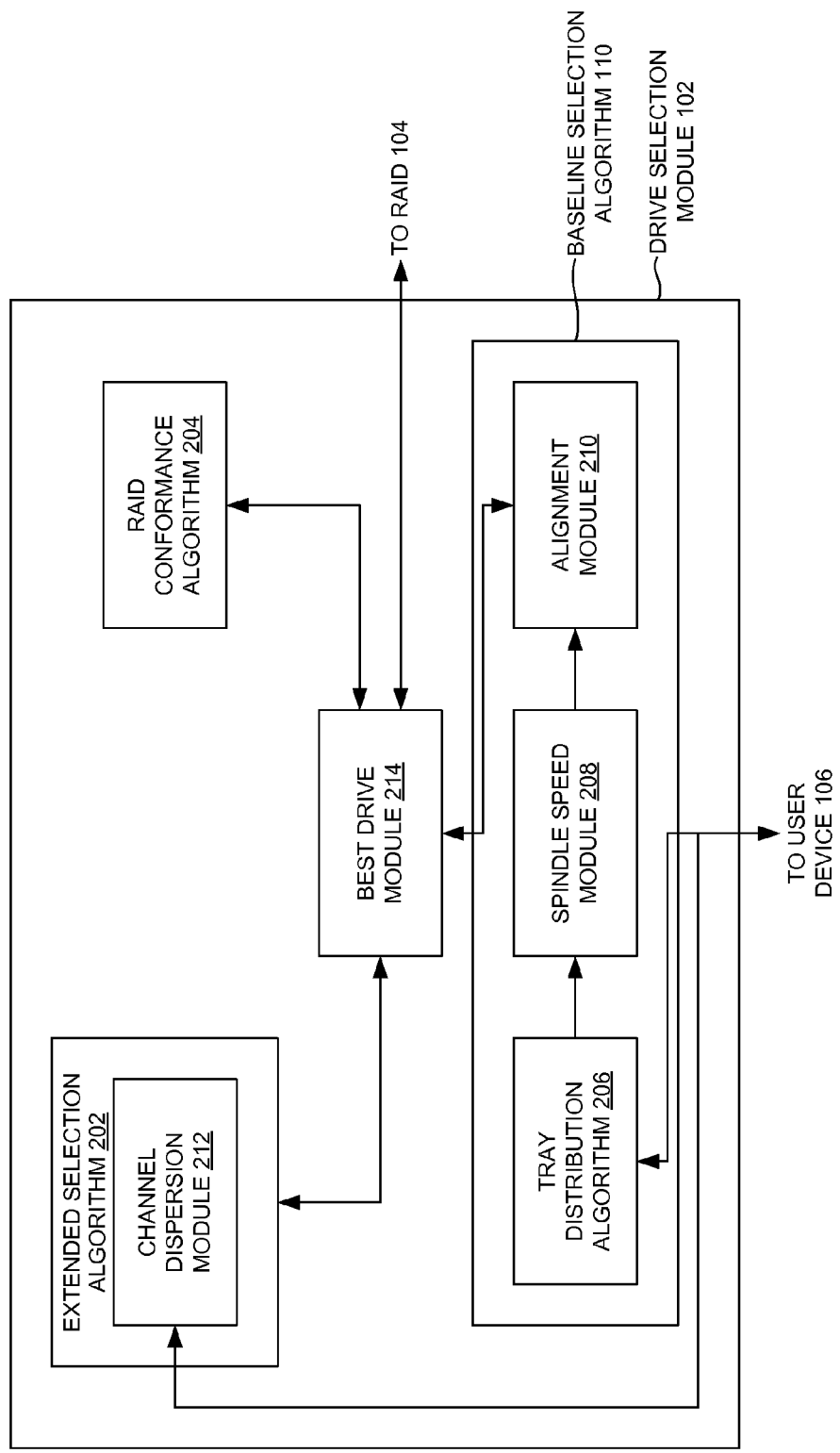
FIG. 2 is an exploded view of the drive selection module of FIG. 1, according to one embodiment.

FIG. 2 is an exploded view of the drive selection module of FIG. 1, according to one embodiment. Particularly, FIG. 2 illustrates an extended selection algorithm 202, a RAID conformance algorithm 204, a tray distribution module 206, a spindle speed module 208, an alignment module 210, a channel dispersion module 212, and a best drive module 214. The extended selection algorithm 202 (e.g., which may be a set of ordered steps for solving a problem, such as a mathematical formula and/or instructions in a program) may be an engine driving a drive selection process further through adding one or more attributes.

The RAID conformance algorithm 204 (e.g., which may be a set of ordered steps for solving a problem, such as a mathematical formula and/or instructions in a program) may include an additional processing sequence to accommodate a particular RAID group (e.g., a RAID group 1 and/or a RAID group 10 which may need mirroring). The tray distribution module 206 (e.g., which may be a software and/or hardware entity) may be used to maximally distribute a selected set of drives in a volume group across drive trays (e.g., where each tray may hold a set number of drives) of a RAID.

The spindle speed module 208 may compare a spindle speed (e.g., which may be a rotating shaft in a disk drive) of a particular drive in a tray having at least one selectable (e.g., available and/or unused) drive to each one of remaining drives in the tray so as to select the particular drive having a maximum spindle speed. The alignment module 210 may enable to select a set of drives substantially based on slot locations of the set of drives such that the set of drives appear to be vertically aligned among the drive trays.

The channel dispersion module 212 may enable to distribute I/O (e.g., input and/or output) load associated with read/write operation on a volume group when a channel dispersion is requested using a dispersion request data. Upon processing the dispersion request data, the drive selection module 102 of FIG. 1 may attempt to satisfy a channel dispersion objective as a lower priority of a selection process than an optimum drive tray distribution and/or a spindle speed maximization.

More particularly, in one example embodiment, the channel dispersion module 212 may check whether a drive that is being compared to is accessed through a preferred channel that is less utilized than a preferred channel of a current best candidate drive. Given that the spindle speed of the drive is equal to that of the best candidate drive, the drive may be selected when the preferred channel of the drive is less utilized than the preferred channel of the current best candidate drive.

This way, selected drives of the volume group may have preferred I/O channels that are maximally dispersed among I/O channels of the RAID. In another example embodiment, in cases where drives have a common spindle speed and/or slot locations the drives permit, the channel dispersion module 212 may select drives such that a zigzag and/or an alternating odd/even slot pattern may be observed. The zigzag and/or the alternating odd/even slot pattern may be based on controller firmware's choice of preferred path of the drives based on the odd/even value of slot numbers of the drives as well as on the slot locations of the drives.

The best drive module 214 may be a software (e.g., and/or hardware) entity that integrate results of the baseline selection algorithm 110, the extended selection algorithm 202, and the RAID conformance algorithm to select a best possible set of drives in a volume group.

In example embodiments illustrated in FIG. 2, modules of the base line selection algorithm 110 may be prioritized in an order of the tray distribution module 206, the spindle speed module 208, and the alignment module 210. Thus, a drive may be selected considering firstly a tray distribution of the drive, secondly a spindle speed of the drive, and thirdly an alignment of the drive with respect to other drives selected to a volume group (e.g., the volume group 1 112 of FIG. 1).

The RAID conformance algorithm 204 may be activated when a certain RAID group (e.g., a RAID level 1 and/or a RAID level 10) requires a processing sequence which may be additional to the baseline selection algorithm 110. The channel dispersion module 212 of the extended selection algorithm 202 may be activated only when a request is made to maximally disperse a selected set of drives in a volume group having preferred I/O channels among I/O channels of a RAID system (e.g., the RAID 104) having the volume group.

For example, a plurality of drives of a volume group (e.g., the volume group 1 112 of FIG. 1) may be automatically selected based on at least one of an optimum tray distribution of the volume group, a spindle speed of each drive in the volume group, and an alignment of the plurality of drives in the volume group. The optimum tray distribution may be obtained through selecting the plurality of drives such that the plurality of drives are substantially evenly distributed across a maximum number drive drays with each drive tray holding at least one selectable drive.

The spindle speed of the each drive in the volume group may be no slower than a spindle speed of any one of unselected drives in the each of the drive trays. The alignment of the plurality of drives in the volume group may be achieved through selecting the plurality of drives based on slot locations of the plurality of drives. In addition, each of the plurality of drives may be accessed through a preferred controller I/O channel that is less utilized when a dispersion request data of the at least one attribute data (e.g., the attribute data 108) is processed.

In another example, a tray distribution module (e.g., the tray distribution module 206) of the baseline selection algorithm (e.g., the baseline selection algorithm 110 of FIG. 1) may iteratively select a single drive from each of drive trays of the volume group starting from a larger drive tray until a requested number of drives in the volume group is reached. A spindle speed module (e.g., the spindle speed module 208) of the baseline selection algorithm may select the plurality of drives with each of the plurality of drives having the spindle speed no slower than a spindle speed of any unselected drive in the each of drive tray. An alignment module (e.g., the alignment module 210) of the baseline selection algorithm may select the plurality of drives to achieve a vertical alignment of the plurality of drives.

A channel dispersion module (e.g., the channel dispersion module 212) of an extended selection algorithm (e.g., the extended selection algorithm 202) may select preferred I/O channels of the volume group that are maximally dispersed among I/O channels of the RAID. A RAID conformance algorithm (e.g., the RAID conformance algorithm 204) may automatically select the plurality of drives that are dispersed across an overall set of drive-side I/O channels such that better read and write operations are achieved on the volume group. A best drive module (e.g., the best drive module 214) may select the plurality of drives of the volume group based on a combination of at least one of the baseline selection algorithm, the extended selection algorithm, and the RAID conformance algorithm.

In yet another example, a drive with a higher spindle speed may be selected in a particular tray than a drive with a lower spindle speed in the particular tray. The set of drives may be selected based on slot locations of the set of drives to align the set of drives vertically.

Figure 3:
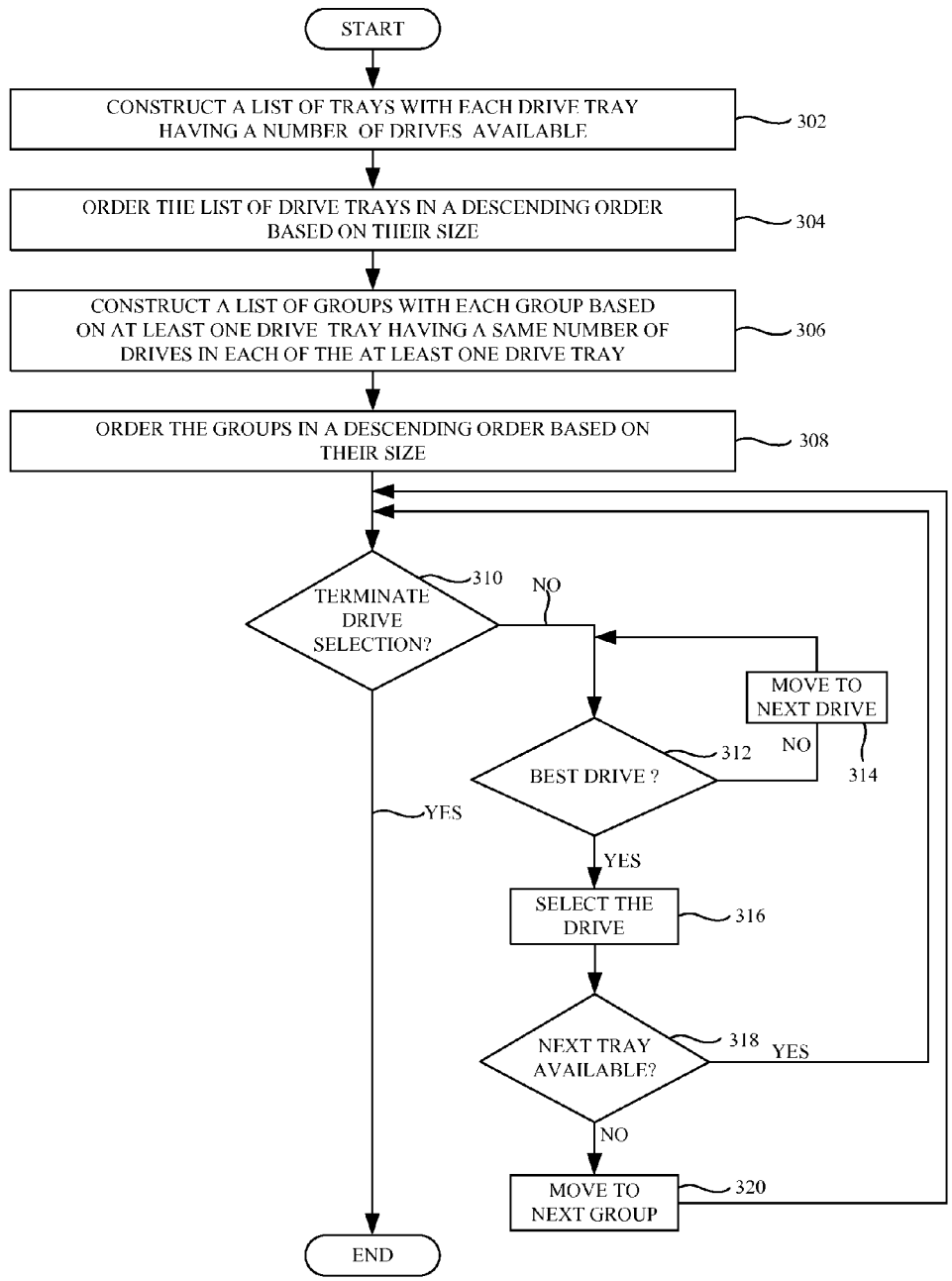
FIG. 3 is a state machine diagram of a volume group creation process based on an automatic drive selection scheme, according to one embodiment.

FIG. 3 is a state machine diagram of a volume group creation process based on an automatic drive selection scheme, according to one embodiment. In process 302, a list of drive trays may be constructed with each drive tray having a number of drives available. In process 304, the list of drive trays may be ordered in a descending order based on their size (e.g., a number of drives in each of the drive trays). In process 306, a list of groups with each group may be constructed based on at least one drive tray having a same number of drives in each of the at least one drive tray. In process 308, the group may be ordered in a descending order based on their size.

In process 310, an inquiry may be made whether to terminate the volume group creation process. In process 312, several steps may be taken to select a best available drive. This process may primarily involve steps to select drives of the volume group such that the drives may be optimally distributed across drive trays of a RAID holding the volume group. The process may secondarily involve steps to select drives of the volume group having a common spindle speed (e.g., which may be the maximum spindle speed available in each of the drive trays). Moreover, the process may tertiarily involve steps to align (e.g., vertically aligned) the drives of the volume group among all drive trays of the RAID.

In process 316, a best candidate drive may be selected and/or added to the volume group. In process 318, an inquiry may be made whether there is another tray available in this particular group. If so, this selection may be repeated to select another drive of the volume group. If not, a next group may be processed to select the another drive in process 320.

For example, a plurality of attributes (e.g., the attribute data 108 of FIG. 1) describing a volume group of a RAID (e.g., the RAID 104) may be processed. Also, a list of tray groups with each member of the tray groups having at least one drive tray with at least one drive selectable to the volume group may be constructed. Moreover, the list of tray groups may be ordered in a descending order based on a number of the at least one drive. Furthermore, a set of drives of the volume group may be automatically selected to evenly distribute the set of drives across a maximum number of drive trays.

FIG. 4A is a table view of an ordered list of drive trays holding selected drives of a volume group 1 112 of FIG. 1, according to one embodiment. Particularly, the FIG. 4A illustrates a drive tray 402, a slot 404, and a spindle speed 406. The drive tray 402 may be an enclosure holding a number of drives. The slot 404 may indicate a position of each of the number of drives. The spindle speed 406 may be a speed of a rotating shaft in a drive. In an example embodiment, FIG. 4A illustrates the ordered list of drive trays once process 302 and process 304 of FIG. 3 take place. The list of drive trays may be ordered in a descending order based on their size. Also, drives in each of the drive trays may be ordered in a descending order based on their slot number.

FIG. 4B is a table view of an ordered list of groups of drive trays of a volume group 1 112 of FIG. 1, according to one embodiment. Particularly, the FIG. 4B illustrates a group value 408, a drive tray value 410, a drive value 412, and a spindle speed 414. The group value 408 may be an identification of each group which belongs to the volume group. The drive tray value 410 may be an identification of each tray which belongs to the volume group. The drive value 412 may indicate an identification of each drive of the volume group. The drive value 412 may be identified with a tray ID and a slot ID. The spindle speed 414 may be a speed of a rotating shaft in the each drive.

In an example embodiment, FIG. 4B illustrates the ordered list of three groups formed once process 306 and process 308 of FIG. 3 take place. The list of groups may be ordered in a descending order based on their size (e.g., a number of drives in each tray). Also, drives in each of the groups (e.g., the drive trays) may be ordered in a descending order based on their spindle speed.

FIG. 4C is a table view of a list of drives selected into the volume group 1 112 of FIG. 1, according to one embodiment. Particularly, the FIG. 4C illustrates a drive value 416 and a spindle speed 418. The drive value 416 may indicate an identification of each drive of the volume group. The spindle speed 418 may indicate a speed of a rotating shaft in the each drive. In an example embodiment, FIG. 4C illustrates a list of drives selected into the volume group (e.g., the volume group 1 112 of FIG. 1) once an entire steps of FIG. 3 takes place (e.g., additionally, the extended selection algorithm 202 and the RAID conformance algorithm 204 of FIG. 2 may also take place as well as the baseline selection algorithm 110 of FIG. 3).

Figure 5:
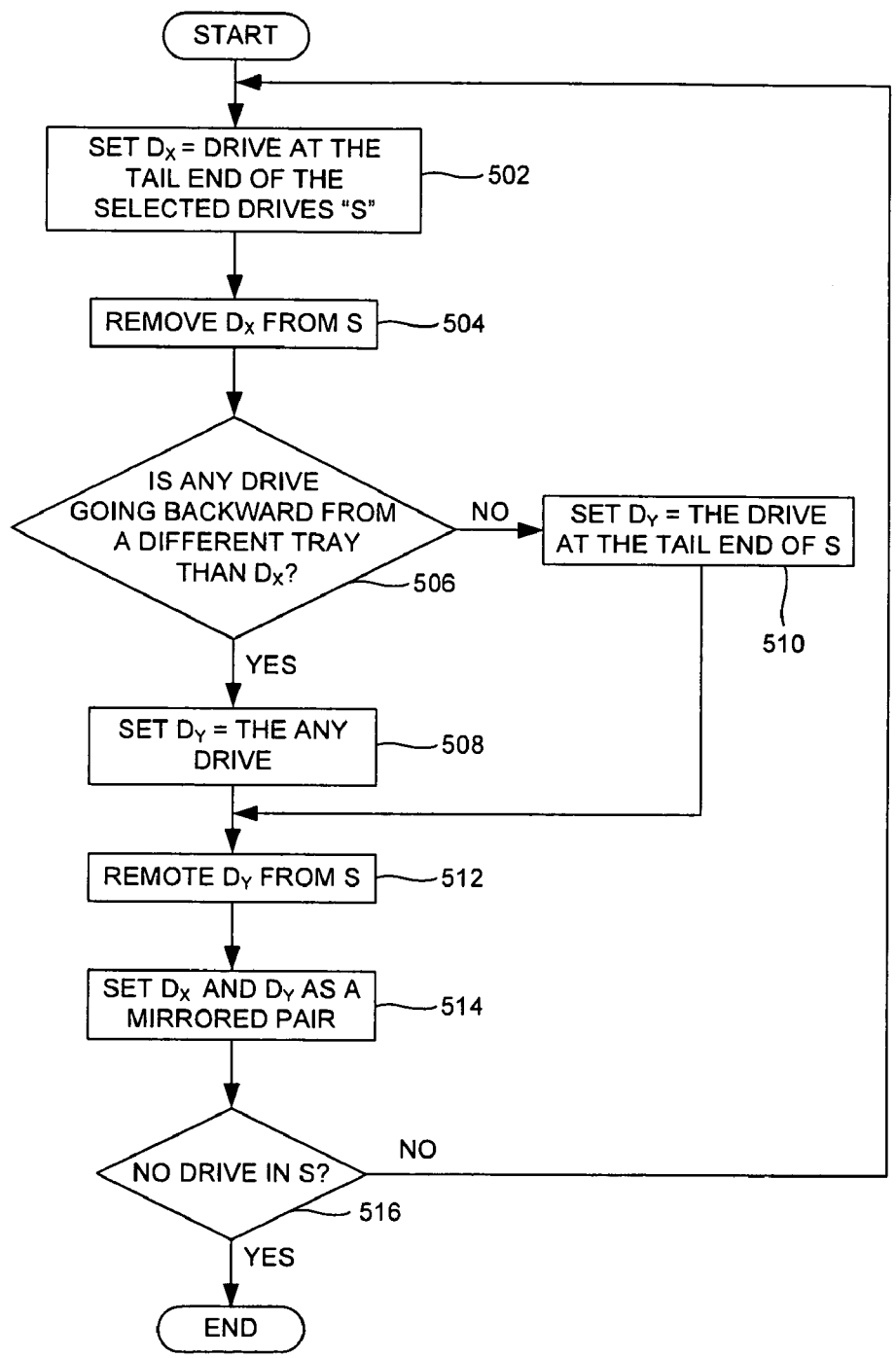
FIG. 5 is a state machine diagram of a drive selection algorithm creating a RAID level 1 and/or a RAID level 10 volume group, according to one embodiment.

FIG. 5 is a state machine diagram of a drive pairing algorithm creating a RAID 1 and/or a RAID 10 volume group, according to one embodiment. The state machine diagram may display steps taken to create mirrored pairs of the RAID 1 and/or the RAID 10 volume group after the baseline selection algorithm of FIG. 3 is processed. In process 502, a drive at a tail end of selected drives S may be set as Dx. In process 504, the Dx may be removed from S. In process 506, starting at the tail end of S and working backward, a first drive Dy that resides in a different tray than Dx may be sought.

If no such drive exists (e.g., all remaining drives in S reside in a same drive tray), the drive at the tail end of S may be selected to be Dy in process 510. In process 512, Dy may be removed from S. In process 514, Dx and Dy may be established as a mirrored pair for the RAID 1 and/or the RAID 10 volume group. In process 516, the drive selection algorithm may be terminated if no drive remains in S. Otherwise, the drive pairing algorithm may be repeated.

The drive pairing algorithm may achieve an objective through prioritizing pairing activities for drives that reside in most-represented drive trays. The most-represented drive trays may reside at an end of S. The most-represented drives may be most difficult to find mates that reside in different drive trays. Through achieving the objective, the drive pairing algorithm may help to achieve tray loss protection.

Figure 6:
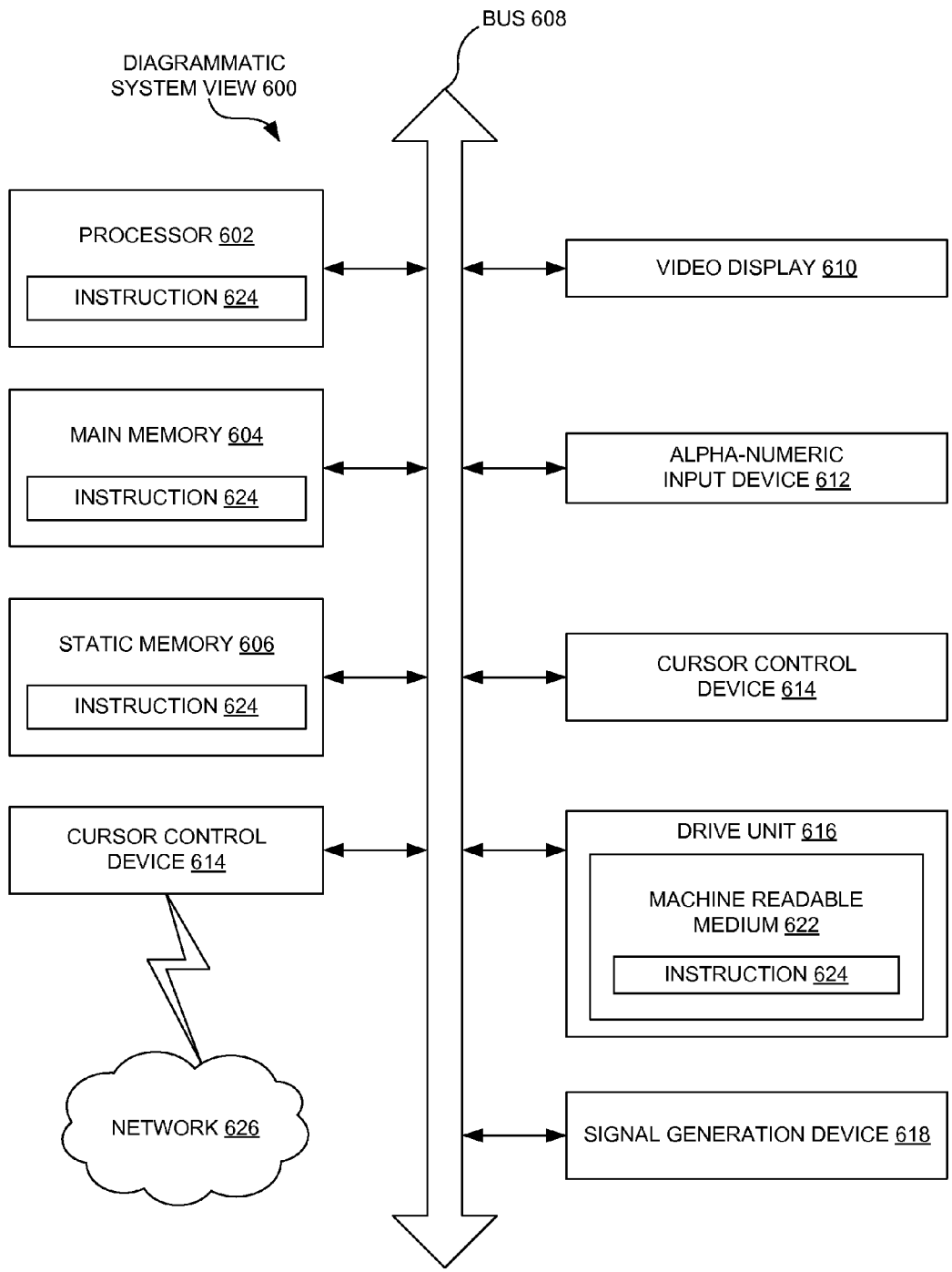
FIG. 6 is a diagrammatic representation of a data processing system capable of processing a set of instructions to perform any one or more of the methodologies herein, according to one embodiment.

FIG. 6 is a diagrammatic system view 600 of a data processing system in which any of the embodiments disclosed herein may be performed, according to one embodiment. Particularly, the diagrammatic system view 600 of FIG. 6 illustrates a processor 602, a main memory 604, a static memory 606, a bus 608, a video display 610, an alpha-numeric input device 612, a cursor control device 614, a drive unit 616, a signal generation device 618, a machine readable medium 622, instructions 624, and a network 626, according to one embodiment.

The diagrammatic system view 600 may indicate a personal computer and/or a data processing system in which one or more operations disclosed herein are performed. The processor 602 may be microprocessor, a state machine, an application specific integrated circuit, a field programmable gate array, etc. (e.g., Intel® Pentium® processor). The main memory 604 may be a dynamic random access memory and/or a primary memory of a computer system. The static memory 606 may be a hard drive, a flash drive, and/or other memory information associated with the data processing system. The bus 608 may be an interconnection between various circuits and/or structures of the data processing system. The video display 610 may provide graphical representation of information on the data processing system. The alpha-numeric input device 612 may be a keypad, keyboard and/or any other input device of text (e.g., a special device to aid the physically handicapped). The cursor control device 614 may be a pointing device such as a mouse.

The drive unit 616 may be a hard drive, a storage system, and/or other longer term storage subsystem. The signal generation device 618 may be a bios and/or a functional operating system of the data processing system. The machine readable medium 622 may provide instructions on which any of the methods disclosed herein may be performed. The instructions 624 may provide source code and/or data code to the processor 602 to enable any one/or more operations disclosed herein.

Furthermore, the machine-readable medium may include communicating a size of the data (e.g., a size of the data may be large compared to a size of the receive buffer) over the serial port. In addition, the machine-readable medium may include clearing a receive buffer in response to the error condition in the data.

Figure 7:
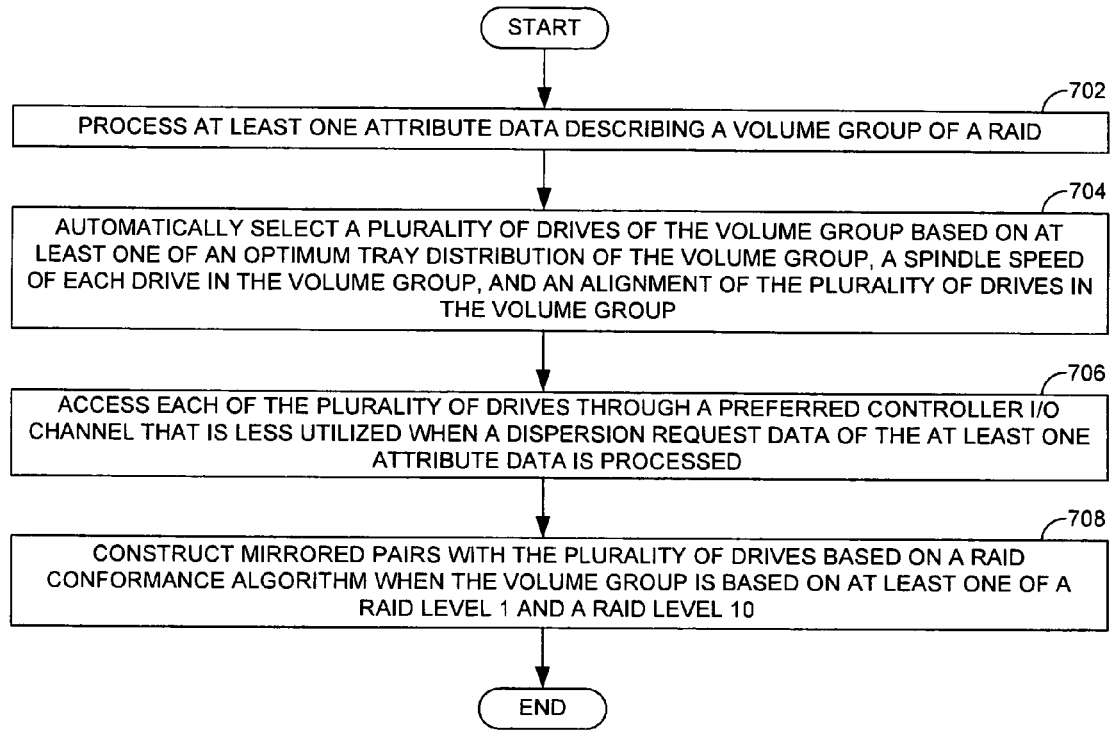
FIG. 7 is a process flow of a RAID automatically selecting drives of the volume group of FIG. 3, according to one embodiment.

FIG. 7 is a process flow of a RAID automatically selecting drives of the volume group of FIG. 3, according to one embodiment. In operation 702, at least one attribute data (e.g., the attribute data 108 of FIG. 1) describing a volume group (e.g., the volume group 1 112) of a RAID (e.g., the RAID 104) may be processed. In process 704, a plurality of drives of the volume group may be automatically selected based on at least one of an optimum tray distribution of the volume group, a spindle speed of each drive in the volume group, and an alignment of the plurality of drives in the volume group.

Each of the plurality of drives may be accessed in operation 706 through a preferred controller I/O channel that is less utilized when a dispersion request data of the at least one attribute data is processed. In operation 708, mirrored pairs with the plurality of drives may be constructed based on a RAID conformance algorithm (e.g., the RAID conformance algorithm 204 of FIG. 2) when the volume group is based on at least one of a RAID level 1 and a RAID level 10.

Figure 8:
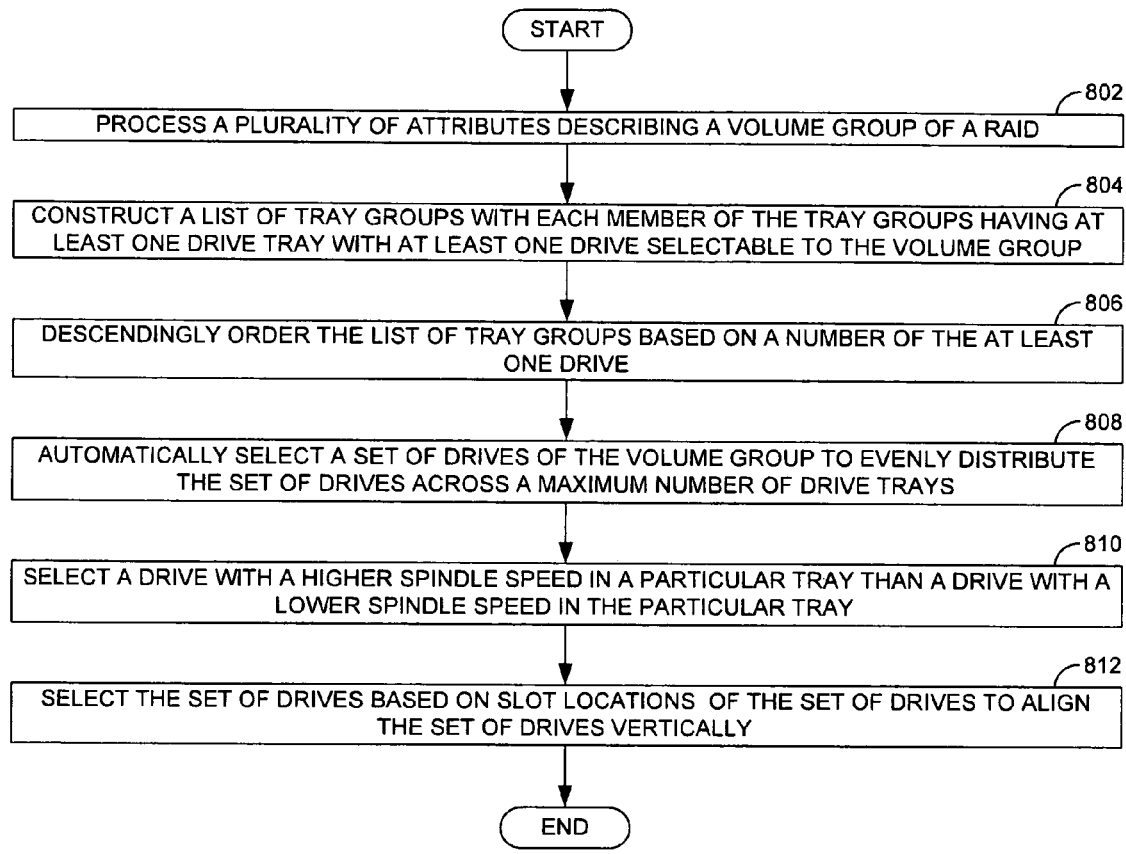
FIG. 8 is a process flow of a controller firmware of a RAID automatically selecting a set of drives of a volume group to evenly distribute the set of drives across a maximum number of drive trays, according to one embodiment.

FIG. 8 is a process flow of a controller firmware of a RAID automatically selecting a set of drives of a volume group to evenly distribute the set of drives across a maximum number of drive trays, according to one embodiment. In operation 802, a plurality of attributes (e.g., the attribute data 108 of FIG. 1) describing a volume group (e.g., the volume group 1 112) of a RAID (e.g., the RAID 104) may be processed. In operation 804, a list of tray groups with each member of the tray groups having at least one drive tray with at least one drive selectable to the volume group may be constructed.

The list of tray groups may be descendingly ordered in operation 806 based on a number of the at least one drive. In operation 808, a set of drives of the volume group may be automatically selected to evenly distribute the set of drives across a maximum number of drive trays. In operation 810, a drive with a higher spindle speed in a particular tray than a drive with a lower spindle speed in the particular tray may be selected. In operation 812, the set of drives may be selected based on slot locations of the set of drives to align the set of drives vertically.

Although the present embodiments have been described with reference to specific example embodiments, it will be evident that various modifications and changes may be made to these embodiments without departing from the broader spirit and scope of the various embodiments. For example, the various devices, modules, engines, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the drive selection module 102 of FIG. 1, and/or the tray distribution module 206, the spindle speed module 208, the alignment module 210, the channel dispersion module 212, and/or the best drive module 214 of FIG. 2 may be enabled using transistors, logic gates, and electrical circuits (e.g., application specific integrated ASIC circuitry) using a drive selection circuit, a tray distribution circuit, a spindle speed circuit, an alignment circuit, a channel dispersion circuit, and/or a best drive circuit.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method of a redundant array of independent drives (RAID), comprising:
   processing at least one attribute data describing a volume group of the RAID, wherein the at least one attribute data to include at least a size request data determining a total number of the plurality of drives in the volume group;
   automatically selecting a plurality of drives of the volume group based on a prioritized order of (i) an optimum tray distribution of the volume group (ii) a spindle speed of each drive in the volume group, wherein the spindle speed of the each drive in the volume group is no slower than a spindle speed of any one of unselected drives in the each of the drive trays, and (iii) a vertical alignment of the plurality of drives in the volume group; and
   accessing each of the plurality of drives through a preferred controller I/O channel that is less utilized when a dispersion request data of the at least one attribute data is processed.

2. The method of claim 1 wherein the alignment of the plurality of drives in the volume group is achieved through selecting the plurality of drives based on slot locations of the plurality of drives.

3. The method of claim 2 further comprising constructing mirrored pairs with the plurality of drives based on a RAID conformance algorithm when the volume group is based on at least one of a RAID level 1 and a RAID level 10.

4. The method of claim 1 in a form of a non-transitory machine-readable medium embodying a set of instructions that, when executed by a machine, causes the machine to perform the method of claim 1.

5. A system of a redundant array of independent drives (RAID), comprising:
   a processor;
   a user device to communicate an attribute data describing a volume group of the RAID;
   a drive selection module to automatically select a plurality of drives of the volume group based on the attribute data using a baseline selection algorithm;
   a tray distribution module of the baseline selection algorithm to iteratively select a single drive from each of drive trays of the volume group starting from a larger drive tray until a requested number of drives in the volume group is reached;
   a spindle speed module of the baseline selection algorithm to select the plurality of drives with each of the plurality of drives having the spindle speed no slower than a spindle speed of any unselected drive in the each of drive tray;

an alignment module of the baseline selection algorithm to select the plurality of drives to achieve a vertical alignment of the plurality of drives;

wherein said modules of the baseline selection algorithm are prioritized in an order of the tray distribution module, the spindle speed module, and the alignment module;

a channel dispersion module of an extended selection algorithm to select preferred I/O channels of the volume group that are maximally dispersed among I/O channels of the RAID;

a RAID conformance algorithm module to automatically select the plurality of drives that are dispersed across an overall set of drive side I/O channels such that better read and write operations are achieved on the volume group; and a best drive selection module to select the plurality of drives of the volume group based on a combination of the baseline selection algorithm, the extended selection algorithm, and the RAID conformance algorithm.

6. A method of a controller firmware of a redundant array of independent drives (RAID), comprising:

processing a plurality of attributes describing a volume group of the RAID;

constructing a list of tray groups with each member of the tray groups having at least one drive tray with at least one drive selectable to the volume group;

descendingly ordering the list of tray groups based on a number of the at least one drive;

automatically selecting a set of drives of the volume group based on a prioritized order of:

(i) an optimum tray distribution to evenly distribute the set of drives across a maximum number of drive trays;

(ii) a spindle speed such that a drive with a higher spindle speed in a particular tray is selected first before a drive with a lower spindle speed in the particular tray, and (iii) a vertical alignment of the set of drives in the volume group based on slot locations of the set of drives.

7. The method of claim 6 wherein one of the plurality of attributes is a number of drives forming the volume group.

8. The method of claim 7 wherein the plurality of attributes to include a dispersion request data which triggers a selection of a particular drive with a less utilized preferred I/O channel.

9. A method of a redundant array of independent drives (RAID), comprising:

processing at least one attribute data describing a volume group of the RAID;

automatically selecting a plurality of drives of the volume group based on a prioritized order of:

a) an optimum tray distribution of the volume group,
b) a spindle speed of each drive in the volume group; and
c) a preferred controller I/O channel that is less utilized when a dispersion request data of the at least one attribute data is processed by accessing each of the plurality of drives.

10. The method of claim 9, further comprising
d) aligning the plurality of drives in the volume group, wherein the at least one attribute data to include at least a size request data determining a total number of the plurality of drives in the volume group.

11. The method of claim 10, wherein the at least one attribute data to include at least a size request data determining a total number of the plurality of drives in the volume group.

12. The method of claim 10, wherein the spindle speed of the each drive in the volume group is no slower than a spindle speed of any one of unselected drives in the each of the drive trays.

13. The method of claim 10 further comprising constructing mirrored pairs with the plurality of drives based on a RAID conformance algorithm when the volume group is based on at least one of a RAID level 1 and a RAID level 10.

14. The method of claim 9 wherein the alignment of the plurality of drives in the volume group is achieved through selecting the plurality of drives based on slot locations of the plurality of drives.

15. The method of claim 14, wherein the optimum tray distribution is obtained through selecting the plurality of drives such that the plurality of drives are substantially evenly distributed across a maximum number drive trays with each drive tray holding at least one selectable drive. drives vertically.

* * * * *